(12) United States Patent
Knuutila et al.

(10) Patent No.: US 7,649,548 B1
(45) Date of Patent: Jan. 19, 2010

(54) METHOD AND APPARATUS FOR TRANSFERRING IMAGE DATA FROM AN INTERNAL CAMERA MODULE

(75) Inventors: Jarno Knuutila, Tampere (FI); Jari Toivanen, Tampere (FI); Janne Juhola, Tampere (FI); Markku Lipponen, Tampere (FI); Ari Aho, Tampere (FI); Janne Haavisto, Tampere (FI); Kaj Saarinen, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/232,265

(22) Filed: Jan. 19, 1999

(30) Foreign Application Priority Data

Jan. 23, 1998 (FI) .................................. 980150

(51) Int. Cl.
*H04N 5/225* (2006.01)
*H04N 5/232* (2006.01)

(52) U.S. Cl. .............................. 348/207.11; 348/211.1

(58) Field of Classification Search .............. 348/207.1, 348/207.97, 207.11, 211.99, 211.1, 211.2, 348/222.1, 333.01, 333.11, 552; 455/556.1, 455/556.2
See application file for complete search history.

(56) References Cited

U.S. PATENT DOCUMENTS

| | | | | |
|---|---|---|---|---|
| 4,630,307 A | | 12/1986 | Cok | 382/25 |
| 4,642,678 A | | 2/1987 | Cok | 358/44 |
| 5,475,441 A | * | 12/1995 | Parulski et al. | 348/552 |
| 5,666,159 A | | 9/1997 | Parulski et al. | 348/211 |
| 5,708,853 A | * | 1/1998 | Sanemitsu | 710/73 |
| 5,737,491 A | | 4/1998 | Allen et al. | 395/2.79 |
| 5,801,919 A | * | 9/1998 | Griencewic | 361/683 |
| 5,841,471 A | * | 11/1998 | Endsley et al. | 348/552 |
| 5,969,750 A | * | 10/1999 | Hsieh et al. | 348/14.1 |
| 6,002,429 A | | 12/1999 | Ochi et al. | |
| 6,005,613 A | * | 12/1999 | Endsley et al. | 348/552 |
| 6,009,336 A | * | 12/1999 | Harris et al. | 455/566 |
| 6,073,034 A | * | 6/2000 | Jacobsen et al. | 455/566 |
| 6,088,746 A | * | 7/2000 | Koppa | 710/63 |
| 6,094,219 A | * | 7/2000 | Roberts et al. | 348/552 |
| 6,141,052 A | * | 10/2000 | Fukumitsu et al. | 348/373 |
| 6,285,398 B1 | * | 9/2001 | Shinsky et al. | 348/552 |
| 6,400,413 B1 | * | 6/2002 | Miyake | 348/581 |
| 6,427,078 B1 | * | 7/2002 | Wilska et al. | 455/550.1 |

(Continued)

FOREIGN PATENT DOCUMENTS

EP 0 659 017 12/1994

(Continued)

OTHER PUBLICATIONS

Finnish Office Action and English translation thereof.

(Continued)

*Primary Examiner*—Justin P Misleh
(74) *Attorney, Agent, or Firm*—Perman & Green LLP

(57) ABSTRACT

A method transfers image information from a camera module (1) to an electronic device, such as a mobile station (23). In the camera module (1), an image is formed by an image sensor (2) having pixels, where the light to which the pixel (P1,1-Pm,n) is exposed is converted into an analog signal which is converted into digital image information. The image information is transferred in serial form, and the transfer of the image information is controlled by the electronic device (23).

40 Claims, 4 Drawing Sheets

U.S. PATENT DOCUMENTS

| | | | |
|---|---|---|---|
| 6,429,896 B1 * | 8/2002 | Aruga et al. | 348/231.99 |
| 6,441,865 B1 * | 8/2002 | Hailey | 348/586 |
| 6,496,276 B1 * | 12/2002 | Dei et al. | 358/1.15 |
| 6,498,621 B1 * | 12/2002 | Ikeda et al. | 348/222.1 |

FOREIGN PATENT DOCUMENTS

| | | |
|---|---|---|
| EP | 0830000 A2 | 3/1998 |
| EP | 0 878 961 | 11/1998 |
| JP | 06-189105 A | 7/1994 |
| JP | 06-292124 | 10/1994 |
| JP | 08-140066 | 5/1996 |
| JP | 08-237526 | 9/1996 |
| JP | 08-256315 A | 10/1996 |
| JP | 08-331285 | 12/1996 |
| JP | 09-284626 | 10/1997 |
| WO | WO 95/30301 | 11/1995 |
| WO | WO 96/35288 | 11/1996 |
| WO | WO 96/38762 | 12/1996 |
| WO | WO 9740621 | 10/1997 |

OTHER PUBLICATIONS

Notice of Reasons for Rejection, Japanese Patent Application No. 11-014411, mailed May 27, 2008.

"Decision of Final Rejection", JP Patent Application No. 11-014411, mailed Jan. 6, 2009.

* cited by examiner

METHOD AND APPARATUS FOR TRANSFERRING IMAGE DATA FROM AN INTERNAL CAMERA MODULE

BACKGROUND OF THE INVENTION

The present invention relates to a method for transferring image information according to the preamble of the appended claim 1, a camera module according to the preamble of the appended claim 7, and a mobile station according to the preamble of the appended claim 13.

In digital cameras and video cameras, an optical image is converted into electrical form by an image sensor, typically a charge coupled device (CCD). Such an image sensor consists of several photosensitive picture elements (pixels) which are arranged advantageously in a matrix form. The number of pixels in the image sensor affects the resolution of the image to be formed. Typically, the image sensor used in cameras and video cameras consists of hundreds of thousands of pixels, for example 640×480=307 200 pixels. In a CCD sensor, light induces a charge in the pixel, which is affected e.g. by the intensity of the light as well as the time of action of light in the pixel, i.e. exposure time. Cameras are equipped with optics whereby the image is focused at the pixels of the image sensor. When a CCD sensor is used, the pixels are uncharged before taking the picture, whereby after a predetermined exposure time, each pixel has a charge which is proportional to the quantity of light directed to it and which can be measured. After the exposure, the entry of light in the CCD sensor is prevented e.g. with a mechanical shutter. The shutter function can be implemented also electrically by sufficiently quick reading of the image sensor.

In the CCD sensor, the pixels are chained by coupling them in series, and the output of the CCD sensor is coupled with the first pixel in the connection in series, whereby the image signal from the CCD sensor can be read by transferring charges from one pixel to the next, timed by a charge transfer signal. The charges can be read from the output of the CCD element, whereby the charge of the pixel coupled to the output is read first. In the same connection, the charge transfer signal induces the transfer of charges in other pixels to the next pixel, i.e. the pixel coupled to the output will receive the charge of the second pixel coupled to the same, the second pixel will receive the charge of the pixel that is third in the connection in series, respectively, etc. Each line of the image sensor can form a separate pixel chain. Each pixel chain is provided with a separate output from the first pixel in the chain, as presented above. From these outputs from the pixel chains, the charges can be transferred e.g. to a transfer register. Reading a CCD image sensor formed in this way requires transfers of charges in a way corresponding to the number of pixels in the pixel chain. Thus, measuring the charge of a single pixel is not possible except by carrying out the transfer of charges as presented above as long as the charge of the desired pixel is in the output of the image sensor. Using such an image sensor, undersampling of the image is difficult and slow because, in practice, the charges of all pixels in the pixel chain must be transferred to the output even though some of the pixels were not processed in undersampling.

The conversion of an analog signal generated by the image sensor to digital form can be conducted with an analog/digital converter. The conversion accuracy of the analog/digital conversion is typically 8 bits, whereby 256 luminous intensity levels are obtained from each pixel. Considering the capacity of human eye, this number is usually sufficient to provide the required image quality. From the analog/digital converter, this conversion result is transferred in parallel form for further processing steps, such as for storing in an image memory or on a video tape. In digital cameras and video cameras of prior art, the display device used is an analog display device, such as a LCD display device equipped with an analog connection, whereby the image is transferred as an analog signal to the display device.

In addition to the above-mentioned CCD sensors, recent development has involved so-called CMOS image sensors, whereby it is also possible to conduct the photoelectric conversion of the image. These CMOS image sensors are based on primarily two different operating principles: integrating and non-integrating image sensors.

In integrating image sensors, the current generated by the pixel is used to charge a capacitor arranged in connection with the pixel. The charge of the capacitor depends on the strength and charge time of the current induced by the pixel. Before image formation, each capacitor is uncharged, after which the current generated by the pixel starts to charge the capacitor, whereby the charge accumulated in the capacitor after the exposure is proportional to the quantity of light to which the pixel was exposed. Setting the exposure time of integrating CMOS image sensors can be handled e.g. by a mechanical shutter, whereby the control electronics can be made simpler whereby the exposure time of each image element is substantially the same, or by timing the discharging of the capacitor and measuring of the accumulated charge substantially the same for different pixels. In an integrating image sensor, a charge is also accumulated in the capacitor when the pixel is in darkness. This may distort the image signal from the pixel. To correct this, a so-called correlated double sampling (CDS) method has been developed, whereby the charge of the capacitor of the pixel is measured after charge resetting preferably before exposure, and this value is stored for each pixel. The charge of the capacitor is measured again after the exposure time, and the stored value is subtracted from this measurement value. The difference corresponds better to the real image signal proportional to the quantity of light than an image signal obtained by one measurement. After the charge measurements presented above, the measurement value is subjected to analog/digital conversion, whereby the measurement result can be stored in digital form.

In non-integrating CMOS image sensors, the current generated by each pixel is measured, which is proportional to the intensity of light to which the pixel is exposed at the time. This kind of a sensor has the advantage that each pixel can be designated separately and the current can be measured irrespective of other pixels and exposure times. This random access is easier in integrating image sensors, if a mechanical shutter is used to set the same exposure time for different pixels.

CMOS image sensors can be also divided into passive and active image sensors. Their primary difference lies in the fact that in active image sensors, the pixel is also provided with an intensifier. This reduces the spreading of the charge of capacitors in the integrating image sensor to the next capacitors at the stage of measuring the charge, which may distort the measuring results in passive image sensors.

Irrespective of the type of the image sensor, the digitised values of the pixels are transferred for further processing typically in analog form, pixel by pixel. Thus, the image field is scanned for example line by line, starting from the first pixel on the first line. The analog image signal can be sent to be displayed e.g. by an analog display device. At the stage of further processing, the analog image signal can be converted to digital form e.g. for storage in an image memory, whereby the digital value formed from the analog signal of each pixel is stored in a memory location corresponding to the pixel in question. The image signal can be subjected to e.g. filtering and noise suppression, if necessary.

In currently known camera modules comprising an image sensor and control logic, the image information can be read either in analog form, whereby the signal must be subjected to analog/digital conversion for further processing steps, or readily converted in parallel digital form. Further, the synchronisation of image information is conducted by the control logic of the camera module in a predetermined image format, whereby typically a standard quantity of information must be transferred from each image. The quantity of information for one image depends on the number of pixels in the image sensor, i.e. the resolution, and the accuracy of the analog/digital conversion of each pixel. For example, in an image sensor consisting of 480 horizontal lines and 640 vertical lines, thereby comprising 307 200 pixels, each of which is subjected to analog/digital conversion of 8 bits, the total information of one image amounts to 2 457 600 bits.

When such a camera module of prior art is connected to a portable electronic device, such as a mobile station, one problem is the greater space needed by the parallel bus solution, compared with using a serial bus for the transfer of image information. In a typical application, information of 8 bits per pixel is used in a black-and-white image and information of 24 bits per pixel in a colour image, whereby at least 8 parallel transfer lines are needed. When a separate camera module is used, the coupling cable to be connected with the parallel bus should comprise conductors for each line of the parallel bus and also a ground conductor and possibly a power supply conductor for the camera module, whereby the coupling conductor becomes considerably more expensive and stiffer to use than a coupling cable of a serial bus containing fewer conductors. Furthermore, possible capacitive coupling between signal transfer lines in the parallel bus may cause cross-talk between adjacent conductors. Cross-talk is easily increased when the length of the conductors is increased. Furthermore, parallel data transmission complicates the structure of the device to be connected to the camera module and increases the manufacturing costs.

The use of a serial bus in solutions of prior art would typically require increasing the data transfer rate at least 8 times compared with data transfer in parallel form, if the aim is to transfer the same quantity of information in the same time. This is not always possible, because fast digital signals have very sharp edges, i.e. the rise and fall times of the signal are very short, whereby they easily induce disturbances in the operation of the electronic device as well as other electronic devices. Also, signals containing rapid changes are susceptible to distortions which may affect the reliability of the data transfer.

One disadvantage with present camera modules is their inflexibility; they produce an image in a determined form at a rate determined by the camera module itself. Information produced by camera modules of prior art cannot be easily affected, whereby it may be necessary to conduct unnecessary functions in the device receiving the image signal particularly when the quantity of image information entering the receiving device exceeds the quantity that can be utilised in the receiving device, whereby transferring the unutilised image information consumes power to an unnecessary degree. Some camera modules of this kind provide the option of adjusting how often a new image is transferred from the camera module. However, the quantity of information in each image is not changed. If the receiving device cannot process all images at the set updating rate but controls the camera module to transfer images at a slower rate, the updating rate may sink to such a low level that it can be detected in the image e.g. as discontinuous movement.

In several digital cameras, an LCD display device is presently used for displaying image information. This display device is used both as a viewfinder for directing the camera to the desired photographic subject and for observing the picture taken, whereby the picture can be taken again, if necessary. Display devices of this kind are typically analog, whereby the image signal is in analog form. When used as a viewfinder, the image displayed with a display device must be updated at a sufficient rate. The frequency of updating the image is limited by the large quantity of image information to be transferred and the limited transfer rate. This results in discontinuous movement of the image to be displayed on the display device, particularly during movement of the camera or the photographic subject. Also in several video cameras, an analog LCD display device is currently used as a viewfinder, whereby the problems are similar during video recording.

BRIEF SUMMARY OF THE INVENTION

It is an aim of the present invention to provide an improved method for transferring image information e.g. to an electronic device, and a camera module from which image information can be transferred in serial form from an electronic device which may also control the transfer of the image. In addition, the image format can be modified according to the need. The method of the invention is characterised in what will be presented in the characterising part of the appended claim 1. The camera module of the invention is characterised in what will be presented in the characterising part of the appended claim 7. Furthermore, the mobile station of the invention is characterised in what will be presented in the characterising part of the appended claim 13. The invention is based on the idea that image information is transferred in serial form to an electronic device at a rate determined by the same. Furthermore, the quantity of image information to be transferred can be adjusted, whereby e.g. in viewfinder mode it is possible to display images with less image information at a sufficient rate so that disturbing jerky movement is not shown in the image to be displayed on a display device. When taking the final picture, the quantity of image information is raised to a desired level.

The present invention gives significant advantages compared with prior art. In a camera implemented by the method of the invention, the viewfinder mode and video recording can be implemented so that the image follows the movements of the camera or the imaging object. In simple photography, the final photograph can be, nevertheless, taken with a resolution which is as high as that possible in cameras of prior art. In video recording, a sufficient image quality is obtained in normal situations. Using the camera module of the present invention, the size and power consumption of the electronic device can be made smaller than when using camera modules of prior art. Moreover, the solutions for transferring image information according to the invention do not require increasing the signal transfer rate, whereby the number of disturbances can be kept significantly smaller than is possible when using solutions of prior art, the image transfer rate being the same.

Furthermore, the present invention gives the advantage that the data transfer bus between the camera module and the electronic device can be made simpler and the connection means for connecting the camera module can be made simpler in the electronic device.

BRIEF DESCRIPTION OF THE SEVERAL VIEWS OF THE DRAWING

In the following, the invention will be described in more detail with reference to the appended drawings, in which.

DETAILED DESCRIPTION OF THE INVENTION

Figure 1A:
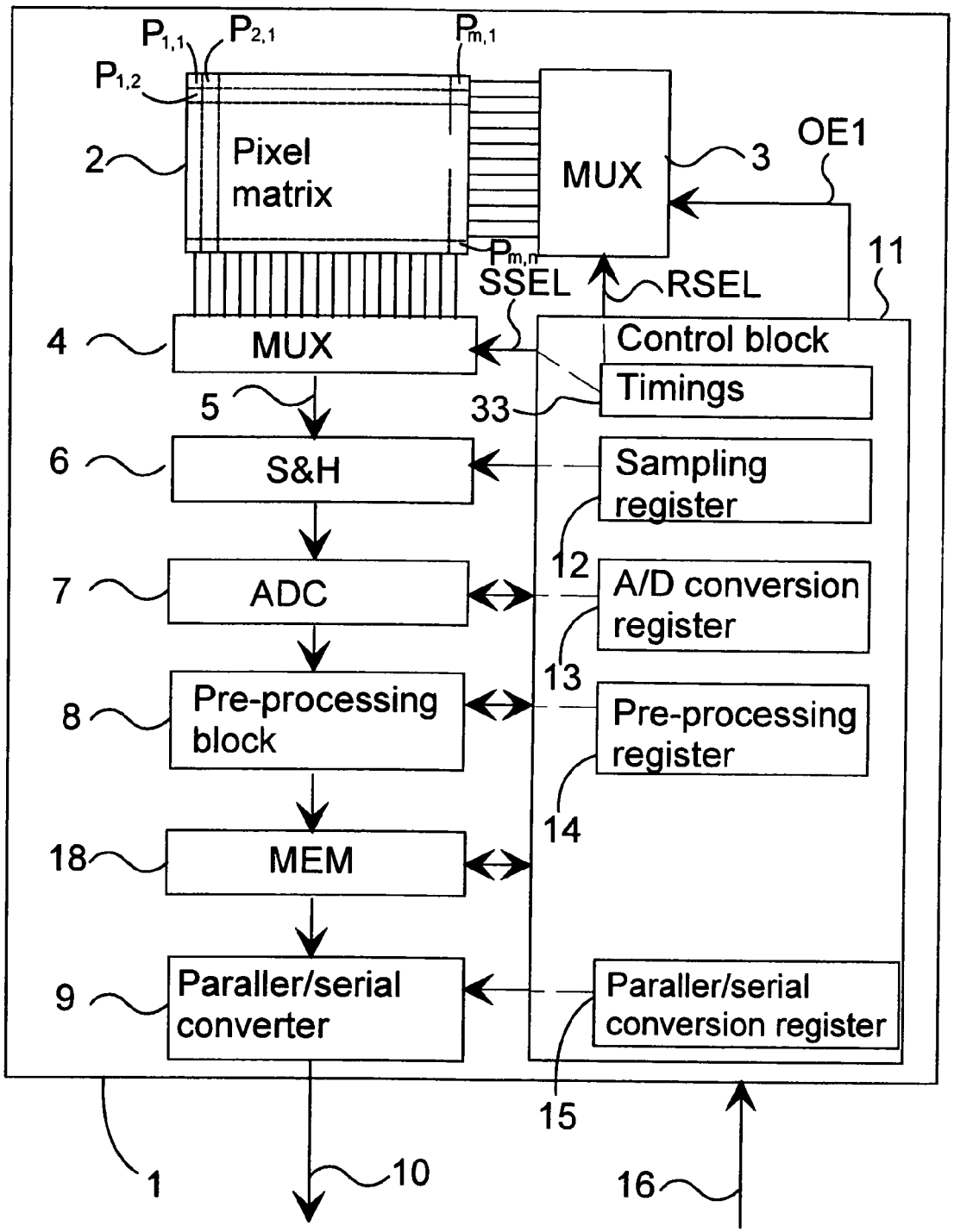
FIG. 1a shows functional blocks of a camera module according to a preferred embodiment of the invention.

FIG. 1a shows functional blocks of a camera module according to a preferred embodiment in a reduced manner. For the photoelectronic conversion of the image, the camera module 1 has an image sensor 2 which in this example is a non-integrating CMOS image sensor, but the invention can also be applied in other types of image sensor, such as integrating CMOS image sensors and CCD image sensors. The resolution of the image sensor 2 is for example 640×480, but the resolution as such has no significance in applying this invention. For clarity, not all pixels are shown in the drawings but as examples the first pixel P1,1, the second pixel P2,1 and last pixel Pm,1 of the first line, the first pixel P1,2 of the second line, and the last pixel Pm,n of the last line are illustrated. A line selector 3 is used to select the pixel line to be examined at a time, and a column selector 4 is used to select the desired pixel P1,1-Pm,n of the line selected by the line selector 3, the current generated by the pixel being conducted to the output 5 of the column selector 4. Thus, the output 5 of the column selector contains the current generated by the selected pixel P1,1-Pm,n which is proportional to the intensity of light to which said pixel P1,1-Pm,n is exposed at the moment of reading. When using an integrating image sensor or a CCD image sensor, the charge is proportional to the intensity of the light to which the pixel P1,1-Pm,n is exposed and to the exposure time, whereby a means is also required to discharge each pixel P1,1-Pm,n. As mentioned earlier in this description, it is not easy to implement addressing of single pixels P1,1-Pm,n in CCD image sensors and integrating CMOS image sensors, but in other respects, the operation of the camera module 1 according to the invention is essentially similar to that when using a non-integrating image sensor 2.

The output 5 of the column selector is coupled to a sample and hold circuit 6. The output voltage of the sample and hold circuit 6 is set at the moment of sampling substantially the same as the input voltage of the sample and hold circuit 6. This output voltage is kept substantially constant until the next sampling instant or during the holding time of the sample and hold circuit 6. With this sample and hold circuit 6, it is possible to keep the measuring voltage supplied to the analog/digital converter 7 for the time required for analog/digital conversion, whereby the analog/digital conversion is as reliable as possible. If necessary, the digital conversion result of the analog/digital converter 7 is sent to a pre-processing block 8 where the image information can be subjected to some conversion and/or filtering operations, such as conversion of colour image format, conversion of image information for different display devices, and image undersampling.

If the image sensor 2 is intended for taking colour images, each pixel P1,1-Pm,n can consist of three partial elements for different colour components. Typically, a so-called RGB image format (red, green, blue) is used, whereby each colour component can be subjected to a separate photoelectric conversion. This can take place for example by arranging a red filter in front of the pixel measuring the red colour component, preventing the pixel from being exposed to light at substantially other than red wavelengths; in a corresponding manner, a green filter is arranged in front of the pixel measuring the green colour component, and a blue filter is arranged in front of the pixel measuring the blue colour component. In the final image, one dot consists of these three pixels. These pixels corresponding to different colour components can be placed side by side for example on the same line or in the form of an isosceles triangle. Thus, for determining one dot, it is necessary to examine the signal formed by three pixels. This can be done e.g. so that the analog/digital conversion is conducted in the camera module 1 for each colour component one after the other using the same sample and hold circuit 6 and analog/digital converter 7. In another alternative, separate sample and hold circuits and analog/digital converters are arranged for each colour component. Thus, each colour component is further provided with a selector, preferably a column selector 4.

Furthermore, colour image sensors have been developed in which the number of pixels is the same as in a monochrome image sensor. This is achieved e.g. in a way that every other pixel is a pixel measuring green light, every fourth one is a pixel measuring red light and every fourth one a pixel measuring blue light. This is based on the capacity of the human eye; the sensitivity to different colours is different. Information given by the green pixel can be used as luminance information almost directly. In the final image signal, for example a group of four pixels is used to form the image signal of one dot. These methods are disclosed in more detail e.g. in patents U.S. Pat. No. 4,642,678 and U.S. Pat. No. 4,630,307.

The conversion of colour format e.g. from the RGB colour format to a so-called YCbCr format can be conducted by calculation as follows:

$$Y = 0.299\,R + 0.587\,G + 0.114\,B \quad (1a)$$

$$Cb = -0.168\,R - 0.331\,G + 0.5\,B \quad (1b)$$

$$Cr = 0.5\,R - 0.4187\,G - 0.0813\,B \quad (1c)$$

The luminance component Y indicates the grey tones of the image, and this can be used e.g. in displaying a black-and-white image and in displaying a colour image as a black-and-white image. There are two chrominance components, Cb and Cr, which contain the colour information of the image.

From the pre-processing block 8, the image information is transferred to the memory 18 of the camera module. From the memory 18, the image information can be transferred to a parallel/series converter 9 where the digitised image information of each pixel P1,1-Pm,n is converted to serial form. The image information can thus be read in serial form from a serial connection bus 10. As the data transfer format in this serial bus, it is possible to use serial data transfer formats known as such, for example in a way that the image information of 8 bits is framed with initial and terminal bits. The transfer of the image information is advantageously controlled by the electronic device, as will be disclosed below in this description.

For controlling the above-mentioned functional blocks, the camera module 1 is further provided with a control block 11, which in this preferred embodiment includes four control registers 12 to 15 and a timing block 33. A sample register 12 determines at which moment the sample and hold circuit 6 takes a sample from the output 5 of the column selector. A quality register 13 determines the accuracy of the conversion to be conducted by the analog/digital conversion. A pre-processing register 14 determines whether an image format conversion is to be conducted in the pre-processing block 8 and also whether image information in digital form is to be undersampled. The parallel/serial converter 9 is further provided with a parallel/serial conversion register 15 which controls data transfer on the serial bus 10. The control block also takes care of the operations needed for taking a picture, such as resetting the charges of the pixels P1,1-Pm,n and timing the measurement of the charges of the pixels P1,1-Pm,n.

A control serial bus 16 is connected to the control block 11 of the camera module 1 e.g. for transferring control commands and parameters to the control block 11. The control block 11 comprises further means (not shown) for controlling the line selector 3 and the column selector 4.

Figure 1B:
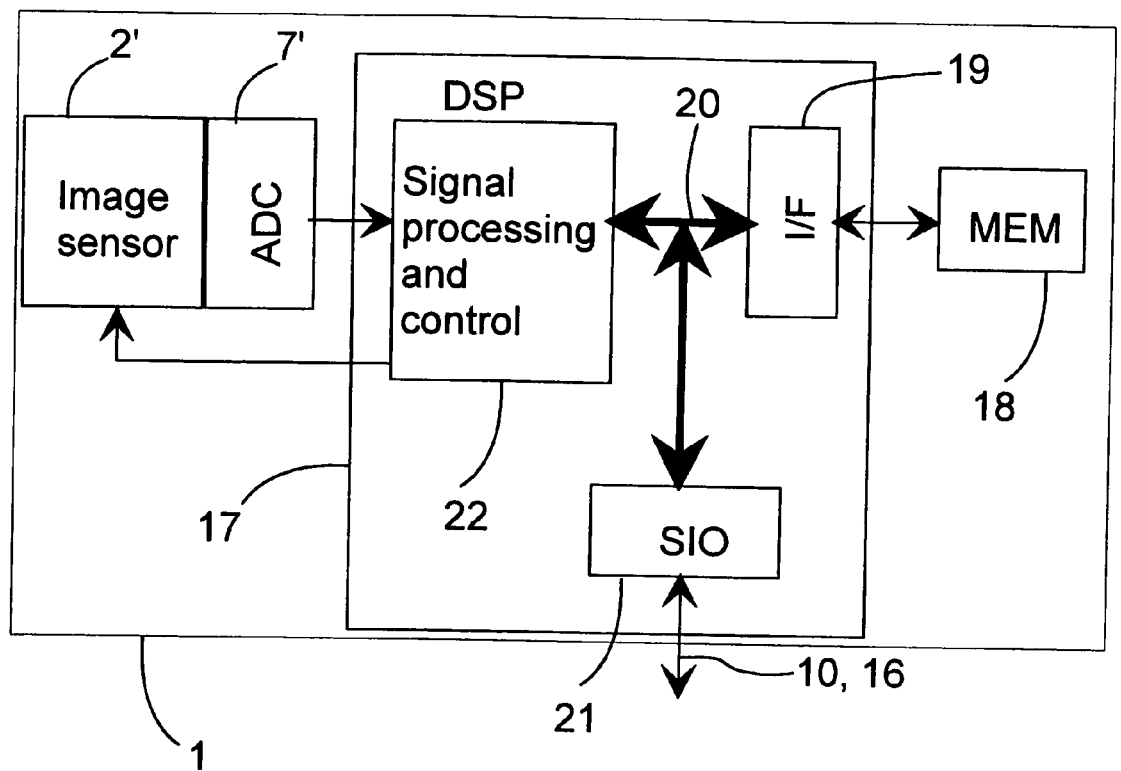
FIG. 1b shows the camera module according to a preferred embodiment of the invention in a reduced block chart.

FIG. 1b shows a camera module 1 according to an advantageous embodiment of the invention in a reduced block chart. In the camera module 1 of FIG. 1b, e.g. the pre-processing block 8, the parallel/serial converter 9 and the control block 11 of FIG. 1a are implemented in the digital signal processing unit 17 (DSP). In FIG. 1b, the image sensor 2 and the line selector 3 and column selector 4 are shown in one block 2'. In a corresponding manner, the sample and hold circuit 6 and the analog/digital converter 7 are shown in one block 7'. The signal processing unit 17 is provided with a memory 18, preferably at least a random access memory RAM, e.g. for temporary data storage. Furthermore, the memory 18 contains the control commands or the like required for controlling the operation of the digital signal processing unit 17. The memory 18 is coupled via a memory connection block 19 to the system bus 20 of the digital signal processing unit. The system bus 20 includes a data bus, an address bus and a control bus, but these are not shown separately, and the practical implementation of these buses is prior art to someone skilled in the art.

The digital signal processing unit 17 further comprises a serial connection circuit 21. It includes a parallel/serial conversion block for the information to be transmitted to the serial bus 10, as well as for converting serial form control information from the control serial bus 16 into parallel form for transmission to the system bus 20.

The signal processing and control block 22 of the digital signal processing unit 17 controls the image sensor 2' for reading the image information of the pixels P1,1-Pm,n. This is conducted advantageously so that in the selection lines of the line selector, which are shown as one line and indicated by the reference RSEL in FIG. 1a, the binary value is set to correspond to the desired line of the image; to select the first line, the value 0; to select the second line, the value 1, etc. Furthermore, an output enabling line OE1 is conducted to the line selector, to change the state of the line selection line corresponding to the binary value set in the selection lines to another logical state, e.g. logical 0 state. Thus, the logical 1 state corresponds to a situation where the line is not selected. In the logical 0 state, the first connection interface (conductor) of the pixels coupled to said line is set close to 0 V. In a corresponding manner, in the selection lines SSEL of the column selector, the binary value is set to correspond to the column to be examined. As a result, the input line of the column selector, connected to the corresponding column lines of the image sensor, is coupled to the output line 5 of the column selector, whereby the signal of this line 5 corresponds to the signal of the selected pixel, which can be converted into digital form.

Figure 2A:
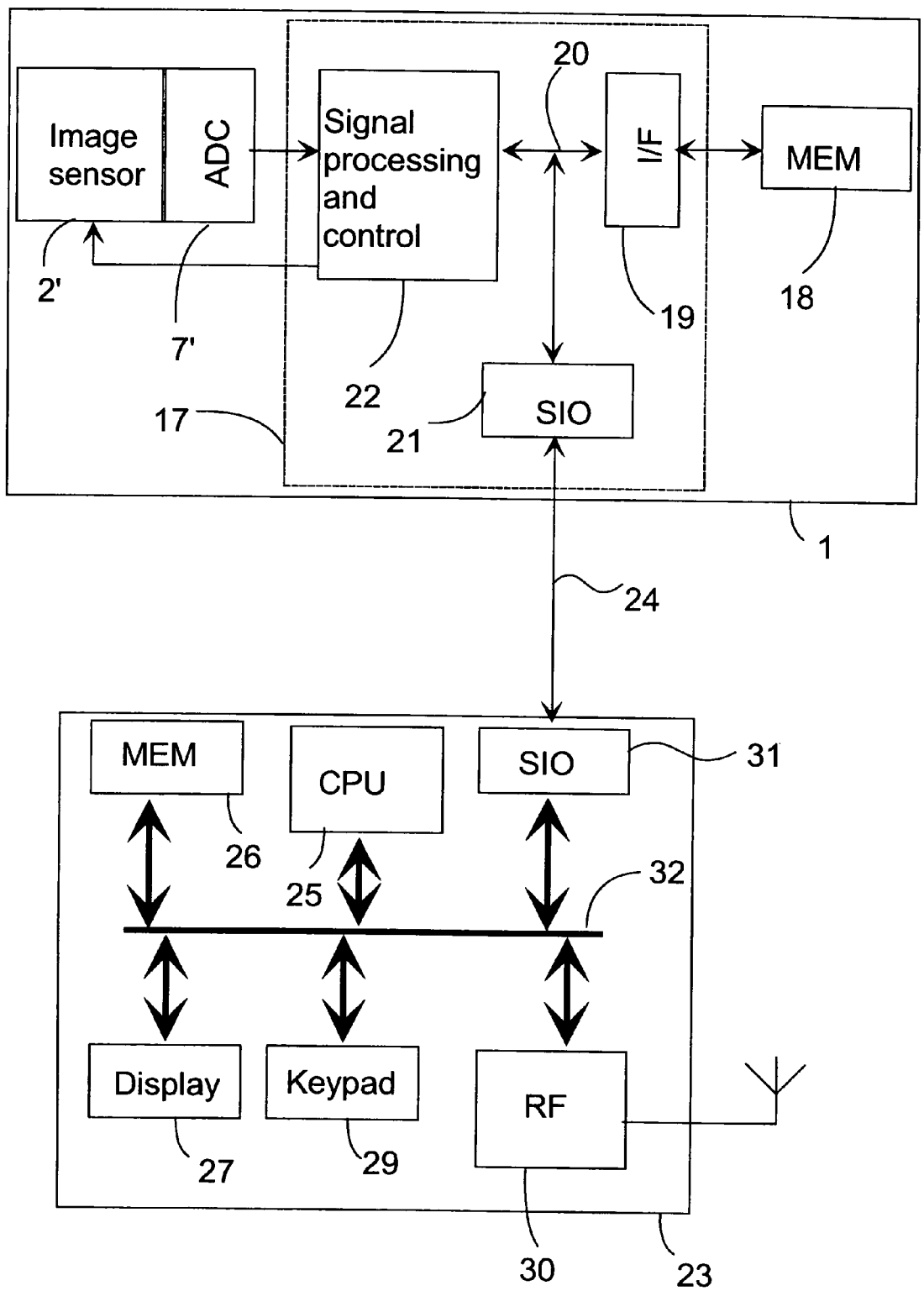
FIG. 2a shows the connection of the camera module according to a preferred embodiment of the invention as a separate device to a mobile station.

FIG. 2a shows the connection of a camera module 1 according to a preferred embodiment of the invention as a separate module to an electronic device, preferably a mobile station 23, by means of an external connection bus 24. The external connection bus 24 comprises a serial bus 10 and a control serial bus 16, whereby control information can be transferred from the mobile station 23 to the camera module 1 and image information can be transmitted from the camera module to the mobile station 23, respectively. The mobile station 23 is provided e.g. with a control unit 25 comprising advantageously a microprocessor CPU or a corresponding processor, a memory 26 and a serial connection block 31 (serial input/output) for coupling the external connection bus 24 to the mobile station 23. For example the serial/parallel conversions between the external serial bus 24 and the system bus 32 of the mobile station take place in the serial connection block 31. The memory 26 can be used e.g. for storing image information read from the camera module 1, whereby the image can be displayed for example with a display device 27. One advantage of this separate camera module 1 is that the same camera module 1 can be used in connection with different electronic devices equipped with the required connection means for connecting the external connection bus 24 with the electronic device. The external connection bus 24 can consist of conductors, or it can be implemented e.g. with infrared data transmission means.

Figure 2B:
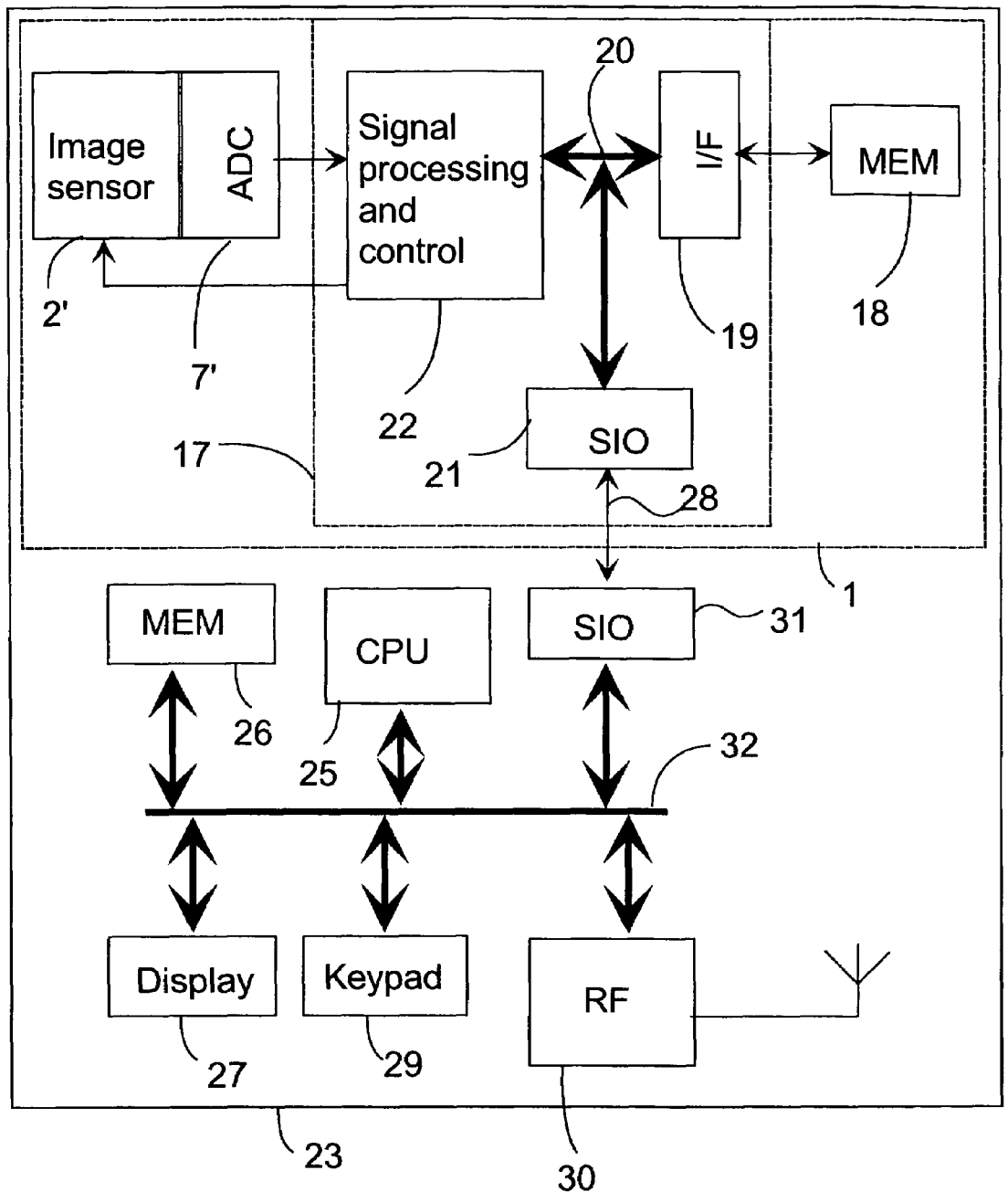
FIG. 2b shows the integration of the camera module according to a preferred embodiment of the invention in a mobile station.

FIG. 2b shows a solution in which the camera module 1 according to the invention is integrated in the mobile station 23. Thus, an internal serial connection bus 28 is arranged between the camera module 1 and the control block 25 of the mobile station, to transfer control and image information between the camera module 1 and the control block 25 of the mobile station. The internal serial bus 28 is coupled to the serial connection block 31 of the mobile station which performs e.g. the serial/parallel conversions between the serial bus 28 and the system bus 32 of the mobile station. Using this integrated solution, it is possible to achieve a relatively compact mobile station 23 also equipped with the camera function. This has the advantage that no separate external connection bus is needed between the camera module 1 and the control block 25 of the mobile station, and that the use of such an integrated device is in many situations easier than the use of two separate devices.

In the following, the operation of the method according to the invention will be described. It is assumed that the camera module 1 is intended for taking single photographs, corresponding to a normal digital photographic camera, and that the image sensor 2 is a non-integrating CMOS image sensor. When preparing for taking a picture, the camera module 1 is set to viewfinder mode, whereby image information of the camera module 1 is displayed on the display device 27, so that the user can direct the camera module 1 to the desired photographic subject and perform cut-out operations, if necessary. The optics of the camera module 1 can, in a manner known as such, comprise various objectives, exchangeable objectives and zoom objectives, but these will not be discussed in more detail in this context. The user sets the camera module 1 to viewfinder mode preferably by using the keypad 29 of the mobile station 23. The control block 25 of the mobile station interprets the button pressing and starts to set the function mode of the camera module 1. To set the function mode, the control block 25 of the mobile station sends the required control commands and parameters to the control block 11 of the camera module 1. These control commands contain the setting of registers according to predetermined parameters. For example, a command for taking a picture is set in the sampling register 12. In the quality register 13, the conversion accuracy is set for the analog/digital conversion of each sample, which may vary preferably from 1 to 8 bits in practical applications. In some cases, it may also be necessary to use a greater conversion accuracy. In viewfinder mode, the conversion accuracy is set smaller than in the actual photography mode, for example 4 bits instead of 8 bits. As a result, the analog/digital conversion converts the sample at an accuracy of four most significant bits (MSB), whereby the conversion is also faster than when using a greater conversion accuracy. In a converter based on sequential approximation, reduction of the conversion accuracy to a half means doubling of the conversion rate. With four bits, it is possible to present 16 different values, but this is a sufficient accuracy in viewfinder mode. Furthermore, an increase in the conversion rate means that in the same time it is possible to transfer the image information of several pixels P1,1-Pm,n, whereby, as a result, the image can be updated more often on the display device 27.

Moreover, if desired, it is possible in the pre-processing register 14 to set information on whether the image information is to be subjected to a conversion, e.g. conversion of colour format. Furthermore, it is possible in the pre-processing register 14 to set information on undersampling, which means, for instance, that not all results of analog/digital conversion are transferred further but for example every second one, or only the value of every other pixel is converted, which will also increase the updating rate of image information. Undersampling reduces the resolution of the image, but, it is possible, if necessary, in the receiving device to form an image corresponding to the original resolution from the undersampled image, e.g. by interpolation on the basis of the received image information.

Furthermore, information is transferred from the control block 25 of the mobile station to the control block 11 of the camera module about the moment for taking the picture. This command can be transmitted by the mobile station 23 for example after the previous image has been processed. This applies particularly to non-integrating image sensors. The command for taking the picture can also be transmitted in advance, if taking the picture requires a longer exposure time, e.g. when an integrating sensor is used. Thus, after the transmission of the command for taking the picture, the mobile station 23 has sufficient time for processing the image under processing, before the camera module 1 takes a new picture, and unnecessary waiting for processing of the image can be avoided.

After the camera module has received the command for taking a picture, the control block 11 interprets the command and starts taking the picture. The control block 11 generates control signals for the line selector 3 and the column selector 4 to select the pixels P1,1-Pm,n preferably in a way that one image is read as quickly as possible to eliminate e.g. movement distortions in the image. The pixels are read for example in the following way. After receiving the necessary control commands and parameters, the control block 11 of the camera module sets preferably the first pixel line of the image sensor 2 for reading, with the line selector 3. Next, with the column selector 4, the control block 11 selects the first column, whereby the current of this pixel is present at the output 5 of the column selector and is transferred to the sample and hold circuit 6. It may take a certain setting time to make the current value constant in the output 5 of the column selector before the control block 11 commands the sample and hold circuit 6 to sample this current. The setting time is advantageously some tens of nanoseconds. After the sample and hold circuit 6 has taken the sample, the control block 11 commands the analog/digital converter to start an analog/digital conversion at a precision determined in the quality register 13. The analog/digital converter 7 typically comprises a status line or the like, by means of which the control block 11 can monitor the completion of the analog/digital conversion. After completion of the analog/digital conversion, the control block 11 transfers the conversion result to the pre-processing block 8 and performs pre-processing, if necessary. After this, the image information of the pixel is stored in the memory 18 of the camera module 1, in a memory space allotted to the selected pixel. Next, the control block 11 sets in the column selector 4 information whereby the column selector 4 selects the current of the next pixel into the output 5. This current value is subjected to the same operations as presented above. After conversion of the pixels in the whole line, the control block 11 selects the next line to be converted, with the line selector 3. After the whole image field has been scanned, the image information is stored in the memory 18 and ready to be transferred. This transfer can be implemented e.g. in a way that the camera module 1 transmits information about the completion of the conversion result of the image to the serial bus 10, whereby the control block 25 of the mobile station transmits a command to start image transfer to the control serial bus 16, if the mobile station 23 is ready to receive the image information. After this, the control block 11 transfers the conversion result of the first pixel from the memory 18 to the parallel/serial converter 9, where the conversion result is converted into serial form and transferred to the serial bus 10. If necessary, it is also possible at this stage to reduce the quantity of information to be transmitted by leaving some of the less significant bits untransferred. The control block 25 of the mobile station receives this information and conducts serial/parallel conversion on the same, and transfers the information to the memory 26 of the mobile station, to a memory location reserved for the selected pixel. Next, the information on the second pixel is transferred, and so forth, until the whole image has been transferred.

Next, the control block 25 of the mobile station for example displays the image on a display device 27 by transferring the image information from the memory 26 to the display device 27, where the image information is displayed at a location reserved for it. If the display device 27 is an analog display device, the image information is further subjected to digital/analog conversion before transferring to the display device 27.

When necessary, it is possible to crop a smaller area (window) from the image to be transferred to the mobile station 23. This is conducted preferably by sending the co-ordinates of two opposite edge points (line and column identifications) of the area to be transferred, together with information on the desired conversion accuracy and resolution of the image. Also in this situation, the camera module takes preferably a full picture and stores it in the memory, but only the image information on the desired area is transmitted to the serial bus 10.

Furthermore, the invention can be applied in a way that the camera module 1 always takes a picture with the maximum resolution and conversion accuracy and stores the image in the memory 18. Thus, the resolution and/or conversion accuracy is reduced at the stage of transferring information to the serial bus 10.

In viewfinder mode, the quantity of image information per image to be transferred is smaller than in normal photographic mode; consequently, images can be updated at a faster rate than when using solutions of prior art. Thus, the image is updated faster, and jerky movement cannot be noticed to a significant degree. Nevertheless, the final photograph can be taken with a higher resolution, whereby the control block of the mobile station transmits the required control commands and parameters to the control block 11 of the camera module 1. Taking a picture in this way can be implemented for example so that the user presses a predetermined button in the keypad 29 of the mobile station. Thus, the camera module 1 conducts conversion of the image at a higher resolution, and after completion of the conversion, the camera module 1 transmits the serial bus 10 information about the completion of the image, whereby the control block 25 of the mobile station can start the transfer of the image information. In this case, the transfer of the image information takes a longer time than in the viewfinder mode, but, on the other hand, it is not significant.

The camera module 1 of the invention has the further advantage that image information can be transferred asynchronously in relation to the functions of the camera. Thus, the camera module 1 of the invention can be controlled in a way that it generates an image of the desired type, whereby it is possible, if necessary, to reduce the quantity of image information to be transferred. In camera modules of prior art, the image format and resolution can be changed, but the transfer of image information takes place at a constant rate determined by the camera module, whereby typically either a parallel bus or a fast serial bus is needed for transferring the information at a sufficient rate from the camera module to further processing stages.

Moreover, the camera module 1 of the invention can also be utilised in video recording, whereby each single image consists of a smaller quantity of image information than in camera modules of prior art, but the updating rate of the images can be raised, whereby a more realistic moving image is obtained. Also, pictures taken with the camera module 1 of the invention can be transmitted via a mobile communication network, if necessary. Thus, with reference to the block diagram of FIG. 2a/2b, the control block 25 of the mobile station reads the images in ways presented above and transfers the image information further to a radio element 30, from which the image information can be transmitted via a mobile communication network (not shown) to another mobile station or telecommunication terminal. Thus, the image information can be presented in the receiving telecommunication terminal. If necessary, the control block 25 of the mobile station compresses the image to be transferred to the radio element, whereby the data transmission can be enhanced in the mobile communication network. Because the processing of the image takes place primarily already in the camera module 1, the control block 25 of the mobile station does not need to have such a large processing capacity as when camera modules of prior art are used.

The present invention is not limited solely to the embodiments presented above, but it can be modified within the scope of the appended claims.

The invention claimed is:

1. A method comprising:
    transferring image information from a camera module to an electronic device, wherein the camera module is constructed as an integral part of the electronic device, by:
    capturing an image in the camera module by means of an image sensor comprising pixels which convert light to which the pixels are exposed into an analogue signal, the image being captured at a maximum resolution by using every pixel in the image sensor;
    converting said analogue signal into digital image information by analogue-to-digital conversion,
    in response to the digital image information having been captured at the maximum resolution by the camera module, using the electronic device for determining whether the captured digital image information is to be transferred to the electronic device as captured, or in a reduced form suitable for a view finder mode display, said reduced form comprising image information from substantially the entire image area of the digital image information captured by using every pixel in the image sensor; and
    transferring a selected form of the digital image information from the camera module to the electronic device via an internal serial connection bus of the electronic device.

2. A method according to claim 1, wherein the transfer of digital image information from the camera module to the electronic device is started responsive to a control signal received from the electronic device.

3. A method according to claim 1, wherein the image is displayed on a display of the electronic device.

4. A method according to claim 1, wherein the electronic device is a mobile station and the method further comprises transmitting digital image information, transferred from the camera module to the mobile station, from the mobile station via a wireless link.

5. A method according to claim 1, wherein the digital image information is transferred from the camera module to the electronic device via the internal serial connection bus under control of the electronic device.

6. A method according to claim 1, wherein the camera module is adapted to operate in either one of a normal photographic mode and a viewfinder mode, such that when operating in viewfinder mode the camera module reduces the quantity of digital image information to be transferred from the camera module to the electronic device compared with the quantity of digital image information that is transferred when the camera operates in normal photographic mode.

7. A method according to claim 6, wherein reduction of the quantity of digital image information to be transferred from the camera module is conducted by adjusting the conversion accuracy of the analogue-to-digital conversion.

8. A method according to claim 6, wherein reduction of the quantity of information to be transferred from the camera module is conducted by reducing the resolution of the image.

9. A method according to claim 8, wherein reduction of the resolution of the image is conducted by under-sampling the digital image information.

10. A method according to claim 8, wherein the resolution of the image is restored in the electronic device by interpolation from the received digital image information.

11. A method according to claim 6, wherein the camera module is set into viewfinder mode responsive to a control signal received from the electronic device.

12. A method according to claim 6, wherein the camera module is set into normal photographic mode responsive to a control signal received from the electronic device.

13. A method according to claim 6, wherein reduction of the quantity of digital image information to be transferred from the camera module is conducted by leaving less significant bits of the digital image information untransferred.

14. A method according to claim 6, wherein the camera module captures an image with maximum resolution and reduces the quantity of digital image information to be transferred at the stage when the digital image information is transferred to the electronic device.

15. The method of claim 1 further comprising, when transferring the image data, determining a number of bits to represent each pixel.

16. A camera module constructed as an integral part of an electronic device, the camera module comprising:

an image sensor with pixels for conducting photoelectric conversion, and an analogue-to-digital converter for conversion of an analogue signal generated by said pixels into digital image information, the digital image information being captured at a maximum resolution by using all of the pixels of the image sensor, the camera module further comprising:

a serial connection circuit for transferring digital image information to the electronic device and for receiving control information from the electronic device, wherein said control information operates to determine the amount of the digital image information, captured by the camera module, to be transferred to the electronic device, and further wherein, in response to the digital image information having been captured at the maximum resolution, said control information operates to determine whether the captured digital image information is to be transferred to the electronic device as captured, or in a reduced form suitable for a view finder mode display, said reduced form comprising image information from substantially the entire image area of the captured digital image information captured by using all of the pixels of the image sensor, the captured digital image information being captured at a maximum resolution by the camera module, via an internal serial connection bus of the electronic device and further wherein said control is executed by the electronic device.

17. A camera module according to claim 16, adapted to start the transfer of digital image information from the camera module to the electronic device responsive to a control signal received from the electronic device.

18. A camera module according to claim 16, adapted to operate in either one of a normal photographic mode and a viewfinder mode and, when operating in viewfinder mode, to reduce the quantity of digital image information to be transferred from the camera module to the electronic device compared with the quantity of digital image information that is transferred when the camera operates in normal photographic mode.

19. A camera module according to claim 18, adapted to reduce the quantity of digital image information to be transferred from the camera module by adjusting the conversion accuracy of the analogue-to-digital conversion performed by the analogue-to-digital converter.

20. A camera module according to claim 18, adapted to reduce the quantity of digital image information to be transferred from the camera module by reducing the resolution of the image.

21. A camera module according to claim 20, adapted to reduce the resolution of the image by under-sampling the digital image information.

22. A camera module according to claim 18, adapted to be set into viewfinder mode responsive to a control signal received from the electronic device.

23. A camera module according to claim 18, adapted to be set into normal photographic mode responsive to a control signal received from the electronic device.

24. A camera module according to claim 18, adapted to reduce the quantity of digital image information to be transferred from the camera module by leaving less significant bits of the digital image information untransferred.

25. A camera module according to claim 18, adapted to capture an image with maximum resolution and to reduce the quantity of digital image information to be transferred at the stage when the digital image information is transferred to the electronic device.

26. A mobile station, comprising a camera module constructed as an integral part of the mobile station, the camera module comprising an image sensor with pixels for conducting photoelectric conversion, an analogue-to-digital converter for converting an analogue signal generated by the image sensor into digital image information captured at a maximum resolution by using every pixel in the image sensor, the mobile station comprising an internal serial connection bus for transferring digital image information from the camera module to the mobile station, and in response to the digital image information having been captured at the maximum resolution, said control information operates to determine whether the digital image information is to be transferred to the mobile station as captured, or in a reduced form suitable for a view finder mode display, said reduced form comprising image information from substantially the entire image area of the captured digital image information captured by using every pixel of the image sensor; and to control the transfer of the selected form of the digital image information formed from the camera module to the mobile station, further wherein said control is executed by the mobile station.

27. A mobile station according to claim 26, wherein the internal serial connection bus comprises a serial bus and a control serial bus and that the mobile station is adapted to transfer control information to the camera module via said control serial bus and to receive digital image information from the camera module in serial form via said serial bus.

28. A mobile station according to claim 26, further comprising means for transmitting digital image information, transferred from the camera module to the mobile station, from the mobile station via a wireless link.

29. A mobile station according to claim 26, wherein the camera module is adapted to operate in either one of a normal photographic mode and a viewfinder mode and, when operating in viewfinder mode, to reduce the quantity of digital image information to be transferred from the camera module to the mobile station compared with the quantity of digital image information that is transferred when the camera operates in normal photographic mode.

30. A mobile station according to claim 29, wherein the camera module is adapted to reduce the quantity of digital image information to be transferred from the camera module by adjusting the conversion accuracy of the analogue-to-digital conversion performed by the analogue-to-digital converter.

31. A mobile station according to claim 29, wherein the camera module is adapted to reduce the quantity of digital image information to be transferred from the camera module by reducing the resolution of the image.

32. A mobile station according to claim 31, wherein the camera module is adapted to reduce the resolution of the image by under-sampling the digital image information.

33. A mobile station according to claim 29, wherein the camera module is adapted to be set into viewfinder mode responsive to a control signal received from the mobile station.

34. A mobile station according to claim 29, wherein the camera module is adapted to be set into normal photographic mode responsive to a control signal received from the mobile station.

35. A mobile station according to claim 29, wherein the camera module is adapted to reduce the quantity of digital image information to be transferred from the camera module by leaving less significant bits of the digital image information untransferred.

36. A mobile station according to claim 26, wherein the camera module adapted to start the transfer of digital image information responsive to a control signal received from the mobile station.

37. A mobile station according claim 26, further comprising a display for displaying images produced by the camera module.

38. A method comprising:
transferring image information from a camera module to an electronic device, the camera module constructed as a non-removable, integral part of the electronic device, the method further comprising:
capturing an image in the camera module at a maximum resolution, by means of an image sensor comprising pixels which convert light to which the pixels are exposed into an analogue signal, using every pixel in the image sensor;
converting said analogue signal into digital image information by analogue-to-digital conversion, and
in response to the digital image information having been captured at the maximum resolution by the camera module, using the electronic device for determining, whether the digital image information, after having been captured by the camera module at a maximum resolution, is to be transferred to the electronic device as captured, or in a reduced form suitable for a view finder mode display, said reduced form comprising image information from substantially the entire image area of the digital image information captured using every pixel of the image sensor; and
transferring a selected form of the digital image information from the camera module to the electronic device via an internal serial connection bus of the electronic device.

39. A camera module constructed as a non-removable, integral part of an electronic device, the camera module comprising an image sensor with pixels for conducting photoelectric conversion, and an analogue-to-digital converter for conversion of an analogue signal generated by said pixels into digital image information, the digital image information being captured at a maximum resolution by using every pixel in the image sensor, the camera module further comprising a serial connection circuit for transferring digital image information to the electronic device and for receiving control information from the electronic device, wherein, in response to the digital image information having been captured at the maximum resolution by the camera module, said control information operates to determine the amount of the digital image information to be transferred to the electronic device, and further wherein said control information operates to determine, whether the digital image information, after having been captured by the camera module at the maximum resolution, is to be transferred to the electronic device as captured, or in a reduced form suitable for a view finder mode display, said reduced comprising image information from substantially the entire image area of the digital image information captured by using every pixel in the image sensor via said serial connection circuit to the electronic device and further wherein said control is executed by the electronic device.

40. An apparatus comprising:
a mobile station;
a camera module that is a non-removable, integral part of the mobile station, the camera module comprising an image sensor with pixels for conducting photoelectric conversion, an analogue-to-digital converter for converting an analogue signal generated by the image sensor into digital image information, the digital image information being captured at a maximum resolution by using every pixel in the image sensor;
the mobile station comprising an internal serial connection bus for transferring digital image information from the camera module to the mobile station and, in response to the digital image information having been captured at the maximum resolution by the camera module for transferring control information relating to, said control information operating to determine whether the digital image information is to be transferred to the mobile station as captured, or in a reduced form suitable for a view finder mode display, said reduced form comprising image information from substantially the entire image area of the digital image information captured by using every pixel in the image sensor; and to control the transfer of the selected form of the digital image information from the camera module to the mobile station, and further wherein said control is executed by the mobile station.

* * * * *